(12) United States Patent
Leta et al.

(10) Patent No.: US 8,673,059 B2
(45) Date of Patent: Mar. 18, 2014

(54) RAPID TEMPERATURE SWING ADSORPTION CONTACTORS FOR GAS SEPARATION

(75) Inventors: Daniel P. Leta, Flemington, NJ (US); Harry W. Deckman, Clinton, NJ (US); Peter I. Ravikovitch, Princeton, NJ (US); Bruce A. Derites, Pittstown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 184 days.

(21) Appl. No.: 13/406,150

(22) Filed: Feb. 27, 2012

(65) Prior Publication Data

US 2012/0222554 A1    Sep. 6, 2012

Related U.S. Application Data

(60) Provisional application No. 61/447,812, filed on Mar. 1, 2011, provisional application No. 61/447,806, filed on Mar. 1, 2011, provisional application No. 61/447,824, filed on Mar. 1, 2011, provisional application No. 61/447,848, filed on Mar. 1, 2011, provisional application No. 61/447,869, filed on Mar. 1, 2011, provisional application No. 61/447,835, filed on Mar. 1, 2011, provisional application No. 61/447,877, filed on Mar. 1, 2011.

(51) Int. Cl.
*B01D 53/04* (2006.01)

(52) U.S. Cl.
USPC .................. 95/104; 95/106; 95/114; 95/115; 95/139

(58) Field of Classification Search
USPC .............. 95/96–99, 104, 106, 114, 115, 128, 95/136, 139; 96/154; 585/820, 823, 826; 423/230
See application file for complete search history.

(56) References Cited

U.S. PATENT DOCUMENTS

| | | | |
|---|---|---|---|
| 2,989,383 | A | 6/1961 | Miller |
| 3,594,983 | A | 7/1971 | Yearout |
| 4,094,652 | A | 6/1978 | Lowther |
| 4,269,611 | A | 5/1981 | Anderberg |
| 4,312,641 | A | 1/1982 | Verrando et al. |
| 4,329,158 | A | 5/1982 | Sircar |
| 4,350,501 | A | 9/1982 | Bannon |

(Continued)

FOREIGN PATENT DOCUMENTS

| | | |
|---|---|---|
| CN | 101475430 A | 7/2009 |
| EP | 1 421 986 B1 | 5/2004 |

(Continued)

OTHER PUBLICATIONS

Ruthven, D. M., Thaeron, C. "Performance of a parallel passage adsorbent contactor", Separation and Purification Technology, vol. 12 (1997), pp. 43-60.

(Continued)

*Primary Examiner* — Frank Lawrence, Jr.
(74) *Attorney, Agent, or Firm* — David M. Weisberg; Bruce M. Bordelon

(57) ABSTRACT

Novel adsorbent contactors and methods are disclosed herein for use in temperature swing adsorption for gas separation applications, as well as for heat exchange applications.

26 Claims, 10 Drawing Sheets

(56) References Cited

U.S. PATENT DOCUMENTS

| | | | |
|---|---|---|---|
| 4,424,837 A | 1/1984 | Farrell | |
| 4,433,707 A | 2/1984 | Farnham | |
| 4,702,903 A | 10/1987 | Keefer | |
| 4,729,982 A | 3/1988 | Thistlethwaite et al. | |
| 4,753,919 A | 6/1988 | Whittenberger | |
| 4,772,579 A | 9/1988 | Thistlethwaite et al. | |
| 4,801,308 A | 1/1989 | Keefer | |
| 4,914,218 A | 4/1990 | Kumar et al. | |
| 4,968,329 A | 11/1990 | Keefer | |
| 5,057,296 A | 10/1991 | Beck | |
| 5,074,892 A | 12/1991 | Leavitt | |
| 5,082,473 A | 1/1992 | Keefer | |
| 5,089,034 A | 2/1992 | Markovs et al. | |
| 5,098,684 A | 3/1992 | Kresge et al. | |
| 5,102,643 A | 4/1992 | Kresge et al. | |
| 5,108,725 A | 4/1992 | Beck et al. | |
| 5,141,725 A | 8/1992 | Ramprasad et al. | |
| 5,171,333 A | 12/1992 | Maurer | |
| 5,225,174 A | 7/1993 | Friesen et al. | |
| 5,256,172 A | 10/1993 | Keefer | |
| 5,338,450 A * | 8/1994 | Maurer | 210/286 |
| 5,384,101 A * | 1/1995 | Rockenfeller | 422/211 |
| 5,516,745 A | 5/1996 | Friesen et al. | |
| 5,626,033 A | 5/1997 | Tamhankar et al. | |
| 5,846,295 A | 12/1998 | Kalbassi et al. | |
| 5,958,368 A | 9/1999 | Ryoo et al. | |
| 6,051,050 A | 4/2000 | Keefer et al. | |
| 6,063,161 A | 5/2000 | Keefer et al. | |
| 6,077,457 A | 6/2000 | Friesen et al. | |
| 6,080,226 A | 6/2000 | Dolan et al. | |
| 6,136,222 A | 10/2000 | Friesen et al. | |
| 6,197,092 B1 | 3/2001 | Butwell et al. | |
| 6,293,998 B1 | 9/2001 | Dolan et al. | |
| 6,315,817 B1 | 11/2001 | Butwell et al. | |
| 6,406,523 B1 | 6/2002 | Connor et al. | |
| 6,475,265 B1 | 11/2002 | Baksh et al. | |
| 6,514,318 B2 | 2/2003 | Keefer | |
| 6,607,584 B2 | 8/2003 | Moreau et al. | |
| 6,629,525 B2 | 10/2003 | Hill et al. | |
| 6,651,658 B1 | 11/2003 | Hill et al. | |
| 6,652,627 B1 | 11/2003 | Tonkovich et al. | |
| 6,691,702 B2 | 2/2004 | Appel et al. | |
| 7,049,259 B1 | 5/2006 | Deckman et al. | |
| 7,231,784 B2 | 6/2007 | Howard et al. | |
| 7,270,792 B2 | 9/2007 | Deckman et al. | |
| 7,491,250 B2 | 2/2009 | Hershkowitz et al. | |
| 7,507,274 B2 | 3/2009 | Tonkovich et al. | |
| 7,524,358 B2 | 4/2009 | Saxena et al. | |
| 7,527,670 B2 | 5/2009 | Ackley et al. | |
| 7,704,305 B2 * | 4/2010 | Nishida | 96/154 |
| 7,799,730 B2 | 9/2010 | Ringer et al. | |
| 7,803,215 B2 | 9/2010 | Russell et al. | |
| 7,938,886 B2 | 5/2011 | Hershkowitz et al. | |
| 7,959,720 B2 | 6/2011 | Deckman et al. | |
| 2003/0015093 A1 | 1/2003 | Wegeng et al. | |
| 2003/0116016 A1 | 6/2003 | Monzyk et al. | |
| 2003/0209149 A1 * | 11/2003 | Myasnikov et al. | 96/146 |
| 2005/0045030 A1 | 3/2005 | Tonkovich et al. | |
| 2006/0075777 A1 | 4/2006 | Howard et al. | |
| 2006/0102519 A1 | 5/2006 | Tonkovich et al. | |
| 2006/0162556 A1 | 7/2006 | Ackley et al. | |
| 2006/0165574 A1 | 7/2006 | Sayari | |
| 2006/0210454 A1 | 9/2006 | Saxena et al. | |
| 2006/0249020 A1 | 11/2006 | Tonkovich et al. | |
| 2007/0085227 A1 | 4/2007 | Tonkovich et al. | |
| 2007/0240449 A1 | 10/2007 | Howard et al. | |
| 2007/0246106 A1 | 10/2007 | Tonkovich et al. | |
| 2008/0028286 A1 | 1/2008 | Chick | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2008/0314245 A1 | 12/2008 | Hershkowitz et al. | |
| 2009/0151562 A1 | 6/2009 | Russell et al. | |
| 2009/0211441 A1 | 8/2009 | Reyes et al. | |
| 2009/0217691 A1 | 9/2009 | Schmidt et al. | |
| 2009/0294348 A1 | 12/2009 | Krogue et al. | |
| 2009/0308248 A1 | 12/2009 | Siskin et al. | |
| 2009/0326279 A1 | 12/2009 | Tonkovich et al. | |
| 2010/0251887 A1 | 10/2010 | Jain | |
| 2010/0263534 A1 | 10/2010 | Chuang | |
| 2010/0326272 A1 | 12/2010 | Asaro et al. | |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 2002/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Suib, Steven L., O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

* cited by examiner

Figure 7/12
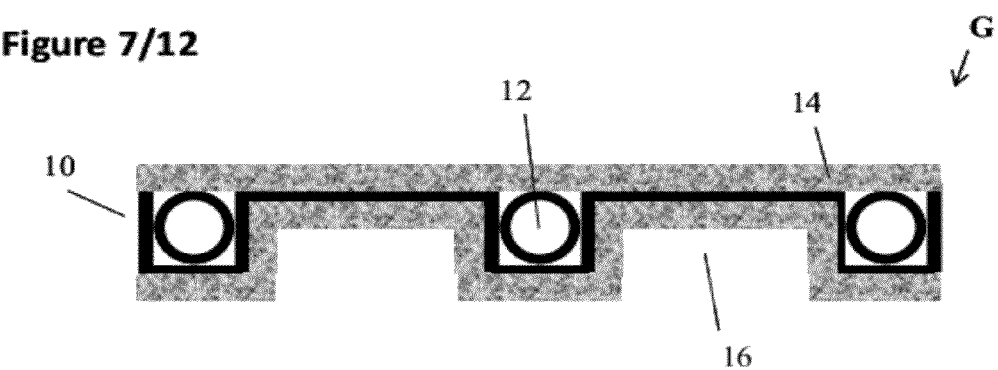
Figure 8/12
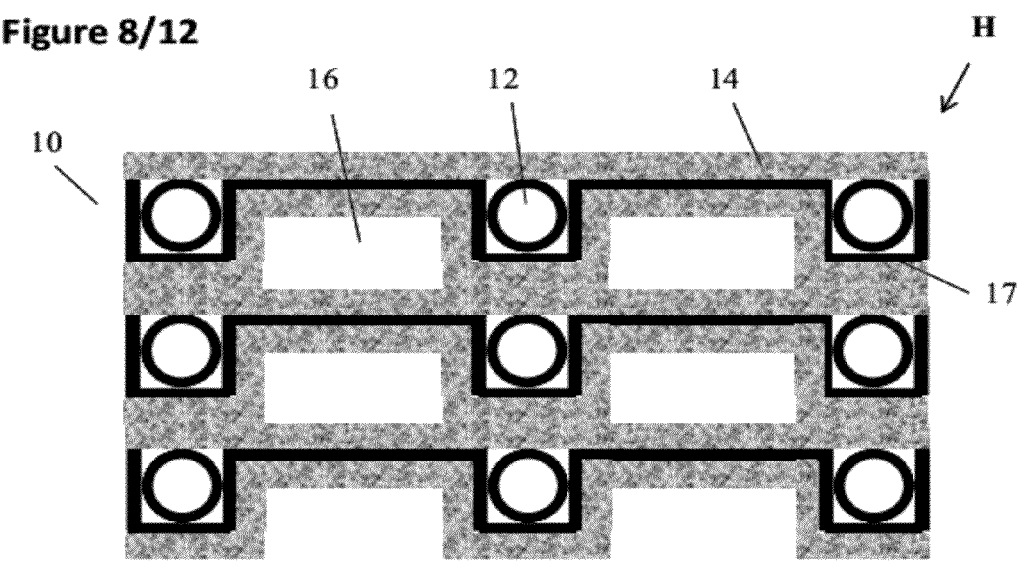

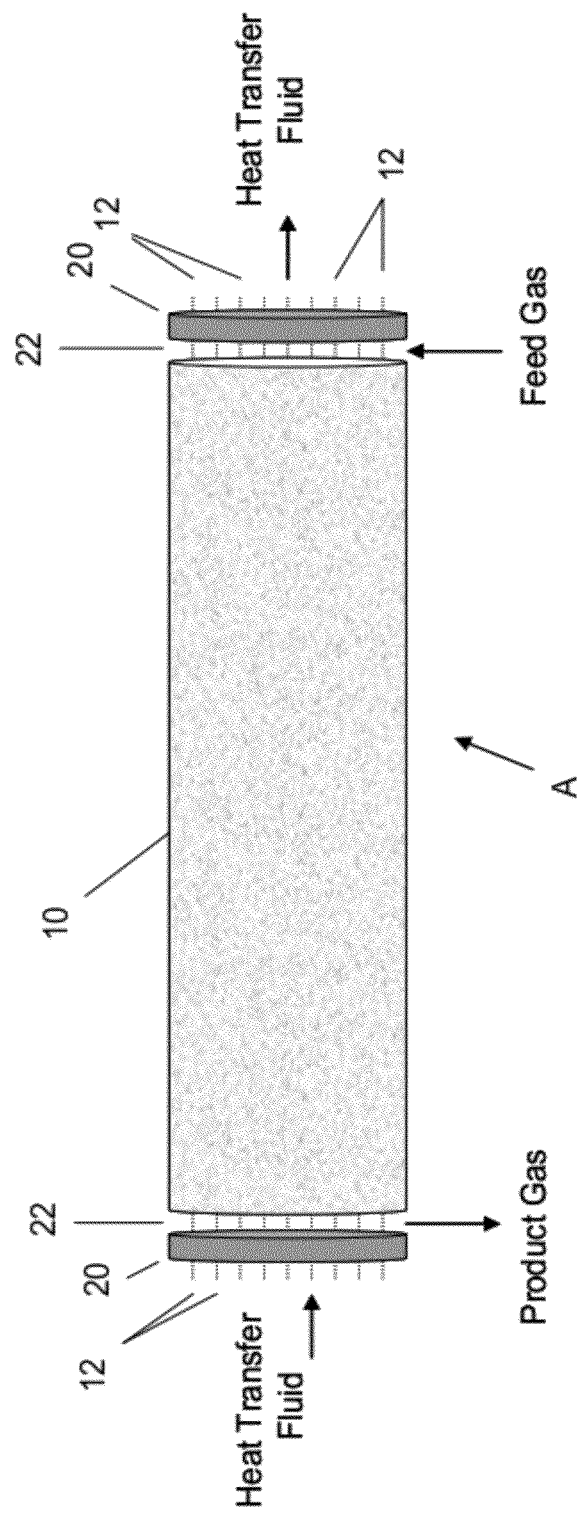
Figure 12/12

RAPID TEMPERATURE SWING ADSORPTION CONTACTORS FOR GAS SEPARATION

CROSS-REFERENCE TO RELATED APPLICATION

This application claims priority to U.S. Provisional Ser. No. 61/447,812 filed Mar. 1, 2011, herein incorporated by reference in its entirety. This application further claims priority to related U.S. Ser. Nos. 61/447,806, 61/447,877, 61/447,824, 61/447,848, 61/447,869, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to co-pending U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

This invention relates to novel adsorbent contactors and processes for their use in temperature swing adsorption for gas separation applications.

BACKGROUND OF THE INVENTION

Gas separation is important in many industries and can typically be accomplished by flowing a mixture of gases over an adsorbent that preferentially adsorbs more readily adsorbed components relative to less readily adsorbed components of the mixture. One of the more important types of gas separation technology is swing adsorption, such as pressure swing adsorption (PSA). PSA processes rely on the fact that under pressure gases tend to be adsorbed within the pore structure of a microporous adsorbent material or within the free volume of a polymeric material. The higher the pressure, the greater the amount of readily adsorbed component will be adsorbed. When the pressure is reduced, the adsorbed component is released, or desorbed. PSA processes can be used to separate gases of a gas mixture because different gases tend to fill the micropore of the adsorbent to different extents.

Another important swing adsorption technique is temperature swing adsorption (TSA). TSA processes also rely on the fact that under pressure gases tend to be adsorbed within the pore structure of a microporous adsorbent material or within the free volume of a polymeric material. One major problem with TSA processes is that as the targeted gas material is adsorbed, the heat in the bed rises due to the exothermic heat released during adsorption. Controlling this rise in temperature is very important to optimizing the overall adsorption efficiency of the bed and the purity of the products produced. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components of a gas mixture.

Various methods of supplying heat to an adsorbent for regeneration cycle of the process have been proposed. These include microwave energy (U.S. Pat. No. 4,312,641), installation of electrical heaters inside the packed adsorbent bed of the adsorber (U.S. Pat. No. 4,269,611), and direct application of an electric current to the adsorber for electrodesorption (U.S. Pat. No. 4,094,652). However, many of the conventional TSA processes have significantly long cycle times, often as long as 12 hours.

TSA has the advantage that by swinging the gas mixture's temperature, instead of the pressure, compression costs can be minimized or even avoided. Another advantage of TSA is that adsorption isotherms are strongly influenced by temperature. Thus, very high purity products can be obtained by adsorbing impurities at low temperature (where adsorption is strong) with the release of a strongly held impurity species being possible by means of high temperature for desorption. However, existing TSA equipment and processes has several disadvantages. For example, the time to swing adsorbent beds over a temperature range sufficient to affect the desired separation can be relatively long, which means that the equipment must be large and as a consequence economically unattractive. Additionally, the construction of properly functioning adsorbent contactors in the art are often of complex design, and are expensive to design and fabricate. Therefore, there is a need in the art for TSA hardware components that can result in shorter cycle times, and are fabricated from readily available materials, thus making the TSA process more economically attractive.

SUMMARY OF THE INVENTION

A preferred embodiment of the present invention herein can include a temperature swing adsorbent contactor comprised of an inlet end and an outlet end, further comprising: i) a plurality of open flow channels whose length is fluidly connecting the inlet end to the outlet end of the contactor, wherein at least one wall of said at least one open flow channel is comprised of an adsorbent material; ii) at least one support layer, in contact with, and supporting the adsorbent material; and iii) a plurality of microtubes in contact with, and supported by, the at least one support layer.

In certain preferred embodiments, the adsorbent contactor can comprise at least two support layers, and the support layers, when viewed in a plane perpendicular to the length of the open flow channels, can each be substantially flat and substantially parallel relative to each other. Additionally or alternately, the adsorbent contactor can be comprised of at least one support layer wound into a spiral when viewed in a plane perpendicular to the length of the open flow channels.

Further additionally or alternately, the adsorbent contactors herein can contain microtubes having inside diameters from 0.20 mm to 2 mm.

An additional preferred embodiment herein can include a swing adsorption process for separating contaminant gas components from a feed gas mixture containing at least one target gas component, which process comprises: a) conducting the feed gas mixture to a temperature swing adsorbent contactor having at least an inlet end and an outlet end, wherein the adsorbent contactor further comprises i) a plurality of open channels whose length is fluidly connecting the inlet end to the outlet end of the contactor, wherein at least one wall of said at least one open flow channel is comprised of an adsorbent material; ii) at least one support layer, in contact with, and supporting the adsorbent material; and iii) a plurality of microtubes in contact with, and supported by, the at least one support layer; b) flowing at least a portion of the feed gas mixture through the open flow channels; c) during an adsorption cycle, adsorbing at least portion of the target gas in the adsorbent material; d) retrieving a first product stream from the outlet end, wherein the first product stream has a lower mol % of the target gas component than the feed gas mixture; and e) during a desorption cycle, passing heating fluid through at least a portion of the microtubes, thereby desorbing at least portion of the target gas in the adsorbent material to form a second product stream.

In certain preferred process embodiments, the feed gas mixture can comprise methane and $CO_2$ wherein $CO_2$ can be the target gas component.

BRIEF DESCRIPTION OF THE DRAWINGS

FIG. 7 hereof is a representation of an alternative embodiment of the adsorbent contactor of the present invention wherein each support layer is corrugated having a series of alternating ridges and grooves wherein at least a fraction of the grooves are occupied by a microtube. There is also shown an adsorbent material and a gas channel defined by the adsorbent between layers.

FIG. 8 hereof is a representation of an adsorbent contactor of the present invention comprised of multiple units of the structure shown in FIG. 7 hereof.

FIG. 12 hereof is a representation of a cylindrical adsorbent contactor assembly of the present invention showing an end cap arrangement for both ends of the contactor, which end caps have encapsulated therein microtubes extending from the ends of the contactor. This end cap arrangement ensures that heating/cooling fluid is kept isolated from the feed gas mixture and product gas stream.

DETAILED DESCRIPTION OF THE EMBODIMENTS

Figure 1:
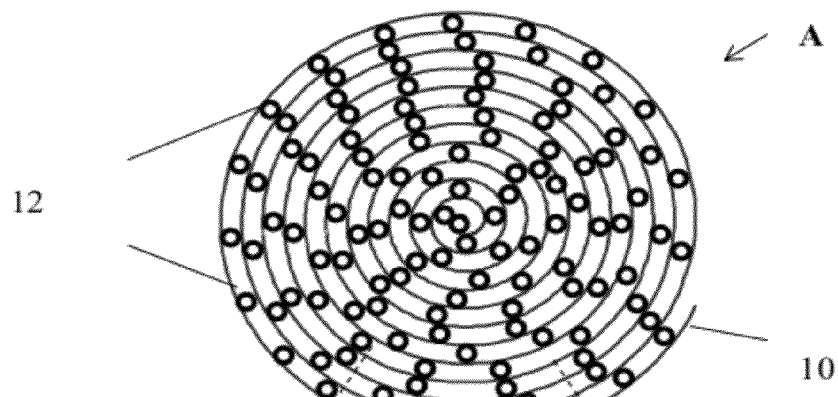
FIG. 1 hereof is a representation of a spirally wound cylindrical swing adsorption contactor comprised of layers of a spirally wound support member having a plurality of microtubes encased between layers.

All numerical values within the detailed description and the claims herein are modified by "about" or "approximately" the indicated value, and take into account experimental error and variations that would be expected by a person having ordinary skill in the art.

The present invention relates to novel adsorption contactors for use in temperature swing adsorption processes that are capable of capturing a target gas, such as $CO_2$, from a gas mixture, such as a natural gas stream. It will be noted that the terms "adsorption contactor" and "adsorbent contactor" are used interchangeably herein. The adsorption contactors of the present invention are utilized in a TSA process that employs at least one contactor that is repeatedly cycled through at least two steps: an adsorption step and a thermally assisted desorption/regeneration step. Regeneration of the adsorption contactors in the processes herein can be achieved by increasing the temperature of the contactor to an effective temperature so as to result in desorbing at least a fraction, preferably substantially all, of the target component that was adsorbed by the adsorbent during the adsorption step. The contactor can then be cooled so that another adsorption step can be performed. In a preferred embodiment, the thermal swing adsorption process can be conducted with rapid cycles, in which case it is referred to as a rapid cycle temperature swing adsorption (RCTSA) process. The total cycle time of the temperature swing adsorption process, for purposes of this invention, is defined as the overall time between the start of successive adsorption steps. In preferred embodiments herein, the total cycle time can be 30 minutes or less, e.g., between 10 seconds and 20 minutes, between 10 seconds and 15 minutes, between 10 seconds and 10 minutes, or between 10 seconds and 5 minutes. It should be understood that the cycle time can advantageously be as fast as possible to achieve the desired purity and percent recovery range. In certain embodiments, the ultimate goal for rapid cycle time can be from 10 seconds to 60 seconds. The thermal regeneration step in the processes herein can be assisted with use of a partial pressure purge displacement, or even a pressure swing. These combinations of processes are referred to herein as temperature swing processes, as long as they employ a step that uses an induced heat input to the adsorbent, and preferably an increase in the temperature of the adsorbent, at some point during the regeneration step.

The first step in any swing adsorption process is an adsorption step. In the adsorption step, one or more components of the gas mixture can be removed by adsorption onto the bed (or structured adsorbent) from the feed gas mixture as it is flowed through the adsorbent contactor. These adsorbed components herein are referred to as strongly adsorbed components, target gas components, or contaminant gas components, and they tend to liberate heat when adsorbed during the adsorption cycle (or "step") of the overall temperature swing adsorption processes herein. The non-adsorbed components are referred to as weakly adsorbed components, and they tend to largely pass through the contactor as the product from the adsorption step depleted in strongly adsorbed components. In preferred efficiently designed contactors herein, the mass transfer and heat management of the contactor can be sufficient for the strongly adsorbed components to move through the contactor as a relatively sharp concentration front. In preferred embodiments herein, the adsorption cycle/step can be stopped well before the leading front breaks through the end of the adsorbent bed.

In a preferred embodiment of the present invention the contactor is combined with an adsorbent into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. Preferably, the heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor according to the present invention.

Thermal waves in such contactors can be produced in when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

In a preferred embodiment, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternately, during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, it can be preferred that the recovered energy be used to reduce the amount of sensible heat that must be supplied to heat and cool the contactor. The sensible heat is determined by the heat capacity and temperature rise (or fall) of the contactor. In some preferred embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

The present invention can be better understood by reference to the figures hereof These figures represent various preferred embodiments of the novel adsorbent contactors of the present invention. The structure of each of these embodiments is based on the use of very small diameter tubes, which are referred to herein as "microtubes". By the term "microtubes" we mean tubes having inside diameters ranging from 0.20 mm to 2 mm, e.g., from 0.25 mm to 1.5 mm. The microtubes can generally have a structure similar to hypothermic tubing. The microtubes of the present invention can be manufactured from any suitable material so long as their integrity is capable of withstanding the gaseous environments as well as pressure and temperature swings which they will be subjected to when used in a TSA process. Non-limiting examples of materials of which the microtubes of the present invention can be manufactured can include metals (such as stainless steel, aluminum, nickel, and the like, and combinations or alloys thereof); polymeric materials; carbon; glass; ceramics; and combinations and composites thereof. Metal microtubes can be preferred in some embodiments, especially those comprised of stainless steel and/or aluminum. The length of the microtubes can vary depending on the overall desired length of the adsorbent contactor. It can be preferred that the microtubes, which will carry cooling/heating fluid, be aligned substantially parallel to the flow of the feed gas mixture, although the microtubes may, in a less preferred mode, be aligned substantially perpendicular, or at any other suitable angle, to the direction of flow of feed gas.

Any suitable heating or cooling fluid can be passed through the microtubes, although water can be an advantageous heating/cooling fluid. Although in certain embodiments herein it may be preferred to pass at least some of the heating/cooling fluid through the tubes during at least a portion of the adsorption process, it is within the scope of this invention that, if exemplary (ideal) operating parameters are chosen, the fluid need not necessarily flow through the microtubes during adsorption, but can be kept static. The presence of the cooling fluid contained in the microtubes, in a suitable designed system, can advantageously increase the total heat capacity of the adsorbent contactor to limit the temperature rise during adsorption to an effectively small range. It should be understood that the cooling/heating fluid that passes through the microtubes can generally be kept isolated from the feed gas mixture and product gases flowing to, through, and from the open adsorbent channels. This can be accomplished by any suitable means, such as by having a suitable manifold at each end of the contactor wherein the cooling/heating fluid is collected and conducted to the next step in the cooling/heating fluid cycle.

To simplify the description of the contactors described herein, they can be described herein where the open adsorbent channels and heating/cooling fluid channels are oriented substantially parallel to each other in the contactor, and where the inlet and outlet ends of each the open adsorbent channels and heating/cooling fluid channels are oriented in the contactor on substantially opposite ends such that the feed gases and heating/cooling fluid pass substantially parallel to one another from one end of the contactor to the other. However, unless specifically limited herein, the contactors of the present disclosure contemplate "non-parallel" channels and/or tubes that would be obvious variants to the contactors specifically disclosed in more detail herein. For simplicity, both parallel plate configurations (i.e., where the separate adsorbent layers and channels are oriented substantially flat and parallel to each other) and spiral would configurations (i.e., where the separate adsorbent layers and channels are oriented substantially flat in the construction process and then "wound" into a final spiral layer configuration) are discussed in greater detail herein. Additionally, due to the simplicity and the effectiveness of these two (2) specific design configurations, they are preferred (but not limiting) embodiments of the adsorbent contactor designs herein.

The support for the microtubes can be comprised of any suitable material and/or of any suitable construction and may be porous or non-porous. The support can be comprised entirely of adsorbent material, or it can be comprised entirely of a (relatively) non-adsorbent material but contain an adsorbent material as a layer, embedded within the structure of the support, or the like, or combinations or variants thereof. For example, the support can be a woven fiber cloth or fiber mesh wherein at least a fraction of the fibers are comprised of an adsorbent material and wherein the remaining fraction is comprised of a non-adsorbent material. The adsorbent material can also be comprised of zeolite crystals embedded within the support material. Non-limiting examples of suitable assembly structures for the support layers of the present invention include films, foils, fiber cloths, metallic woven wire mesh, polymeric membranes, as well as surface-treated materials, particularly surface treated metal foils, or combinations or composites of any of the above. The thickness of the support layers can be any effective thickness. By "effective thickness" we mean that the thickness should be capable of providing at least the minimum integrity needed under process conditions for the intended overall structure of the adsorption contactor, be it a spiral wound structure, a layered non-spiral structure, etc.

If the support has no adsorbent properties, then it can be treated by any suitable treating technique to incorporate at least an effective amount of adsorbent material on/within the support material. Non-limiting treating techniques for applying adsorbent material to the support of the present invention can include wash coating techniques, in situ crystallization methods that deposit adsorbent material directly onto the support from a synthesis solution, doctor-blading, spraying, electrodeposition, or the like. All of these techniques are well known to those having ordinary skill in the art, and thus the specific details of these techniques are not discussed herein. In embodiments of the contactors herein, wash-coating can be a preferred technique. Wash coating typically comprises direct deposition on the support and is known to those having at least ordinary skill in the art to coat the adsorbing phase prepared using the operating procedure described, for example, in the reference (see S. L. Suib, C-L O'Young, "Synthesis of Porous Materials", M. L. Occelli, H. Kessler, eds, M. Dekker, Inc., p. 215, 1997).

A typical wash-coating process involves a slurry preparation (e.g., molecular sieve particles, a suitable binder, and optionally a viscosifying agent), slurry application by washing or dipping, drying, and sintering. Once the wet coating is formed, it has to be dried and sintered at relatively high temperatures (e.g., 300° C. to 600° C.) to establish binding among the coating components and adhesion between the coating and the support surface. Care should be taken with such high temperature treatments, as they may adversely affect the properties of the underlying alloys.

Coated supports typically have two major opposing support surfaces, and one or both of these surfaces can be coated with the adsorbent material. The thickness of the substrate support, plus applied adsorbent and/or other materials (such as desiccant, catalyst, etc.), in preferred embodiments herein, can range from about 10 microns to about 2000 microns, e.g., from about 150 microns to about 300 microns.

It should be recognized by those skilled in the art that apparatuses according to the present invention can contain design features that distinguish them from conventional heat exchanger/adsorbent support devices. The mini-tube and foil design can effectively utilize/maximize surface area for heat exchange or adsorbent support while reducing/minimizing the mass and/or total sensible heating requirements of the system. Additionally, the use of very small diameter tubes to contain the heating and cooling fluid with their attendant relatively high crush and burst strength capabilities, can enable use of the contactor/heat exchanger with relatively high differential pressures between the feed fluid and the heat transfer fluids. Such relatively high differential pressures can be at least 100 psi, for example at least 200 psi, at least 300 psi, at least 400 psi, or at least 500 psi (e.g., can range from about 100 psi to about 2000 psi, from about 200 psi to about 2000 psi, from about 300 psi to about 2000 psi, from about 400 psi to about 2000 psi, from about 500 psi to about 2000 psi, from about 100 psi to about 1500 psi, from about 200 psi to about 1500 psi, from about 300 psi to about 1500 psi, from about 400 psi to about 1500 psi, from about 500 psi to about 1500 psi, from about 100 psi to about 1000 psi, from about 200 psi to about 1000 psi, from about 300 psi to about 1000 psi, from about 400 psi to about 1000 psi, from about 500 psi to about 1000 psi, from about 100 psi to about 700 psi, from about 200 psi to about 700 psi, from about 300 psi to about 700 psi, from about 300 psi to about 700 psi, from about 100 psi to about 500 psi, from about 200 psi to about 500 psi, or from about 300 psi to about 500 psi). Additionally or alternatively, a relatively high pressure gas such as a natural gas feed (e.g., ranging from about 100 psig to about 2000 psig, from about 200 psig to about 2000 psig, from about 300 psig to about 2000 psig, from about 400 psig to about 2000 psig, from about 500 psig to about 2000 psig, from about 100 psig to about 1500 psig, from about 200 psig to about 1500 psig, from about 300 psig to about 1500 psig, from about 400 psig to about 1500 psig, from about 500 psig to about 1500 psig, from about 100 psig to about 1000 psig, from about 200 psig to about 1000 psig, from about 300 psig to about 1000 psig, from about 400 psig to about 1000 psig, from about 500 psig to about 1000 psig, from about 100 psig to about 700 psig, from about 200 psig to about 700 psig, from about 300 psig to about 700 psig, from about 300 psig to about 700 psig, from about 100 psig to about 500 psig, from about 200 psig to about 500 psig, or from about 300 psig to about 500 psig) can flow through the gas channels formed between the foil layers while relatively lower pressure water (e.g., less than about 75 psig, less than about 60 psig, less than about 50 psig, less than about 40 psig, less than about 30 psig, less than about 20 psig, less than about 15 psig, less than about 10 psig, less than about 5 psig, from about 1 psig to about 75 psig, from about 5 psig to about 75 psig, from about 10 psig to about 75 psig, from about 15 psig to about 75 psig, from about 20 psig to about 75 psig, from about 30 psig to about 75 psig, from about 40 psig to about 75 psig, from about 1 psig to about 60 psig, from about 5 psig to about 60 psig, from about 10 psig to about 60 psig, from about 15 psig to about 60 psig, from about 20 psig to about 60 psig, from about 30 psig to about 60 psig, from about 1 psig to about 50 psig, from about 5 psig to about 50 psig, from about 10 psig to about 50 psig, from about 15 psig to about 50 psig, from about 20 psig to about 50 psig, from about 30 psig to about 50 psig, from about 1 psig to about 40 psig, from about 5 psig to about 40 psig, from about 1 psig to about 25 psig, from about 5 psig to about 25 psig) can flow in the heat transfer channel tubes. It can additionally or alternatively be preferred but not required that the tubes and foils are in good thermal contact with each other, such that they may be brazed, welded, or soldered together in at least some locations to both increase heat transfer rates and strengthen the structure.

Due in part to the relatively low relative mass per surface area of the apparatuses and the relatively short heat transfer distances between the heat exchange fluids and/or between the heat transfer fluid and the adsorbent of the present invention, the apparatuses can advantageously enable relatively rapid temperature swings when used for thermal swing adsorption and relatively low approach temperatures when being used for heat exchange. Further, the apparatuses can provide a useful system for generation of relatively sharp thermal waves in both the adsorbent passages and/or in the heat transfer fluid channels. These sharp thermal waves can be useful for both selective sequential desorption of multiple adsorbed species and enable efficient heat recovery. Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}$-$T_{10}$) occurs over at most 50% (e.g., at most 40%, at most 30%, or at most 25%) of the length of the apparatus that participates in the mass/thermal transfer. Additionally or alternatively, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and a represents the effective thermal diffusivity of the contactor (in $m^2/s$) over the distance L. In addition or alternatively to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1/s to about 50 m/s or from about 1 m/s to about 40 m/s. Additionally or alternatively, to minimize size and energy requirements, it can be preferred for L to be less than 0.1 meter, e.g., less than 0.01 meter or less than 0.001 meter.

The present invention can be better understood with reference to the figures hereof. All structures represented in the figures can represent preferred embodiments of the present invention but are not to be taken as limiting in any way. Other structures can be envisioned and should fall within the scope of the present invention, as long as they are comprised of a plurality of microtubes for carrying cooling/heating fluid, which microtubes are on/in contact with an adsorbent support associated with an adsorbent material capable of the selective adsorbing one or more components of a gas mixture.

FIG. 1 hereof is representation of one preferred embodiment of the present invention wherein the contactor is in the form of a spiral wound structure A. Microtubes 12 are supported by at least one layer of the support and, in most cases, are sandwiched between two surfaces of support 10. If a spiral wound structure is used, it can be constructed by a prefabrication technique wherein a plurality of microtubes is placed on a substantially flat sheet of support material. If the support material is not itself a facile adsorbent for the intended gas separation, then a layer of adsorbent material can be applied to the sheet either before placement of the microtubes or after placement of the microtubes. The adsorbent can be applied by any suitable technique known in the art, e.g., by a wash coating technique such as described herein or by applying a coating of adsorbent material by a technique other than wash coating and then, for example, doctor-blading it or spray coating it to the desired thickness. Thicknesses of adsorbent layers from 10 microns to 2 mm may generally be utilized. If the support material is a porous material the adsorbent material can be applied in a manner in which particles of adsorbent material fill at least a portion of the pores of the porous structure. For example, a slurry containing adsorbent crystals can be soaked into, or pressured through, a porous layered material, then dried and calcined. If a spiral wound structure is used, it can preferred that it be wound around a mandrel of suitable composition and dimensions relative to the desired final spiral wound structure of the contactor. If desired, a suitable banding device can be used to secure the spiral wound structure in cylindrical form, e.g., to prevent it from unraveling/telescoping. Brazing material or adhesives may optionally be used to bond the microtubes to the support, thus adding rigidity and strength to the overall structure.

Figure 2:
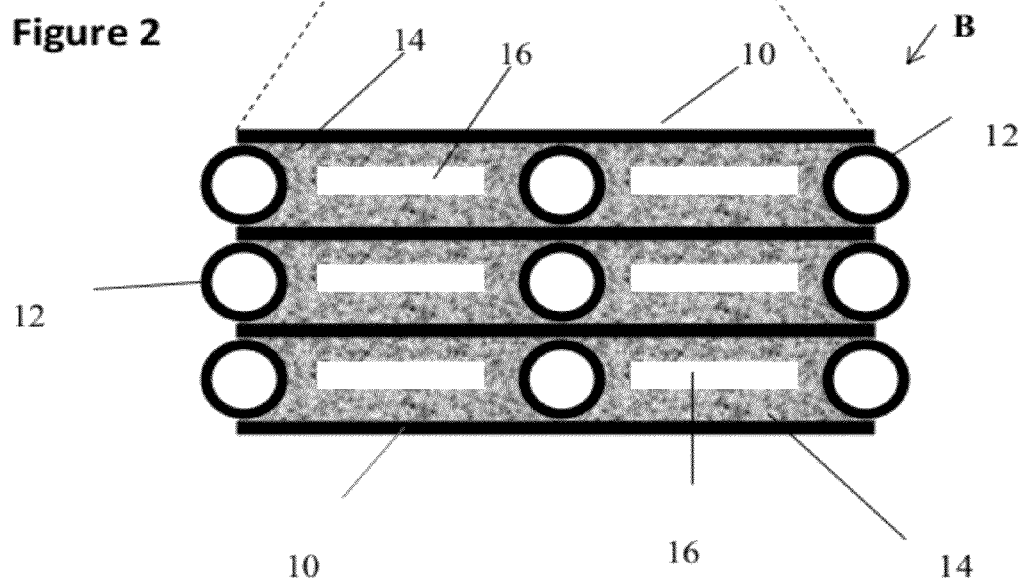
FIG. 2 hereof is a representation of a section of the adsorbent contactor of FIG. 1 hereof showing multiple support layers between which are a plurality of microtubes and an adsorbent material encased between support layers and microtubes. A plurality of gas channels are also shown within the adsorbent material.

FIG. 1 hereof does not specifically indicate the layer of adsorbent material on the support layers; however, embodiments of preferred adsorbent layer configurations are shown in greater detail in FIGS. 2-12 herein. FIG. 2 hereof is a representation of a section B of the spiral wound contactor A of FIG. 1 hereof, but with a suitable adsorbent 14 coated onto the surfaces of support 10 where indicated. The structure of FIG. 2 can represent either a flattened-out section of the structure of FIG. 1, or it can be representative of a stacked layered sheet structure, which is also within the scope of the present invention. There are also provided flow channels 16, which are defined within the adsorbent material and which open flow channels are continuous from inlet to outlet of the adsorbent contactor. The gas mixture can flow through flow channels 16 and cooling and heating fluid can be conducted through microtubes 12. In the case where the adsorbent contactor is of a layered stacked sheet design, it can be preferred that such a design be constructed by first preparing a single layer substructure, then folding it back and forth (not shown) on itself multiple times until the final structure is achieved. The figures hereof do not show the folds that would appear at each end of such a structure, but this description of such a representation would be clear to those with at least ordinary skill in the art.

Figure 3:
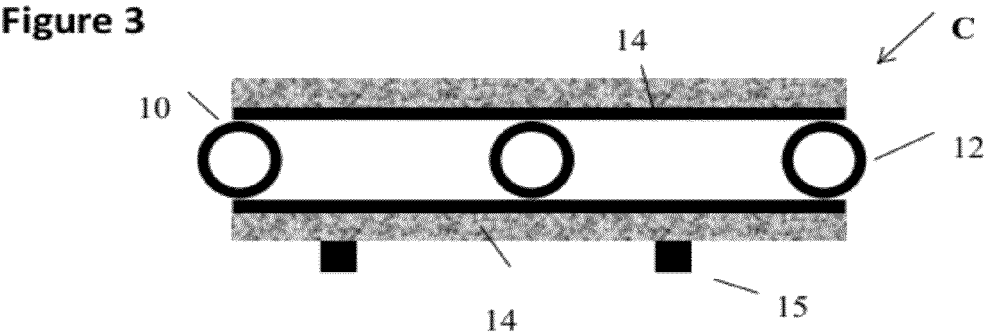
FIG. 3 hereof is another embodiment of the present invention showing a single unit, or section, of a preferred contactor of the present invention. This figure shows a plurality of microtubes between a pair of support layers, but with adsorbent material on the opposite side of the support layers and not in contact with the microtubes. Spacers are used to separate individual pairs and to define the size of a plurality of gas channels.
Figure 4:
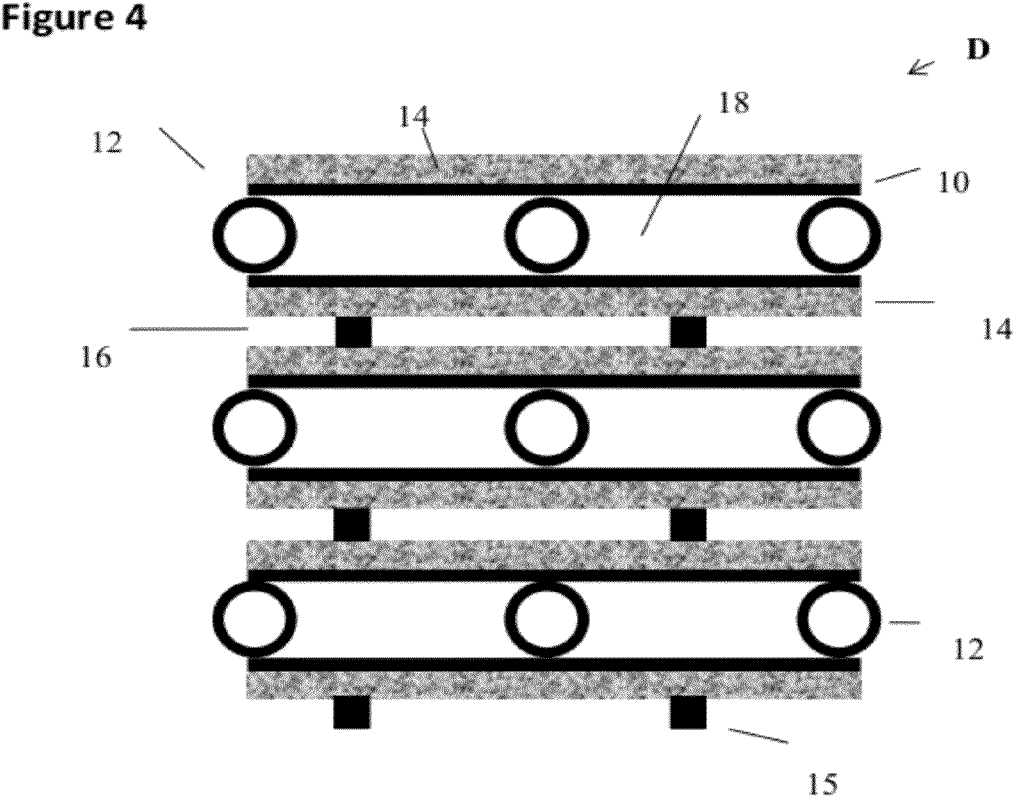
FIG. 4 hereof is a representation of a plurality of pairs of the adsorbent contactor layers of FIG. 3 hereof.

FIG. 3 hereof is an illustration of a substructure C of another preferred adsorbent contactor of the present invention. FIG. 4 hereof shows a section D of a larger structure comprised of multiple layers of substructure C separated by spacers 15. The spacers can be either integral to the support material of they can be a non-integral independent material. If they are integral to the support material, then they could be formed during the manufacture of the support, such as dimples or corrugations of a predetermined size to provide the desired flow channel volume. If they are not integral to the support material, then they can be comprised of any suitable material that can be relatively inactive in the process environment and that should not typically decompose under process conditions. Non-limiting examples of such materials can include particles, such as glass microspheres, wires of suitable size, or the like, or combinations thereof.

Generally, all common numbered elements of the figures hereof refer to the same element, except for their particular arrangement in the various structures. For example, element 14 should always represent the adsorbent material and the microtubes should always be referred to as element 12 for all figures. The structures of FIGS. 3 and 4 hereof show a plurality of microtubes 12 located between two support layers. The support layer can be thought of as having an inner facing surface in contact with microtubes 12 and an outer facing surface containing adsorbent material 14 for the intended separation. Each substructure can be separated from another substructure by use of spacers 15 defining the dimensions of gas flow channels 16. The space 18 between each pair of support layers can be defined by the diameter of the microtubes 12, and preferably is not used to carry either a gas mixture or cooling or heating fluid.

Figure 5:
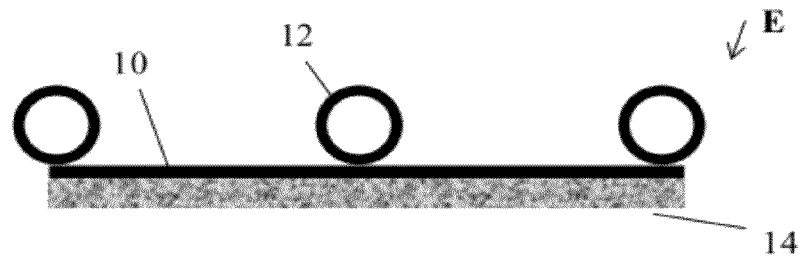
FIG. 5 hereof is a representation of a single unit of another preferred embodiment of the present invention wherein there is provided single support layer containing on one side of said support layer a plurality of microtubes and on the opposite side an adsorbent material.
Figure 6:
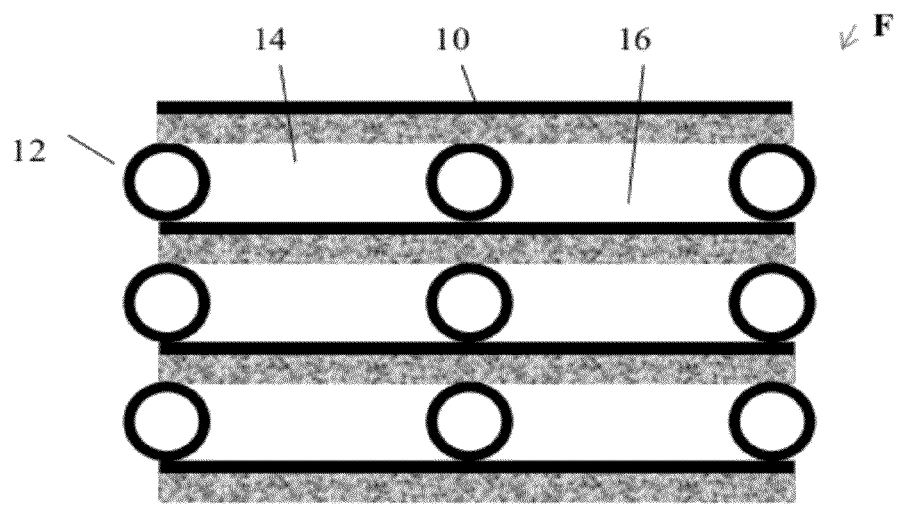
FIG. 6 hereof is a section of an adsorbent contactor comprised of a plurality of the single layer structure of FIG. 5 hereof.

FIGS. 5 and 6 hereof are representations of another preferred adsorbent contactor structure of the present invention wherein microtubes 12 are in contact with one surface of the support layer, and the opposite surface of the support layer contains adsorbent material 14 that can be in contact with a microtubes 12 when the a plurality of substructures E are assembled to form the final contactor structure, a section of which is represented by FIG. 6 hereof.

FIG. 7 hereof is a representation of a substructure G of another preferred structure for the adsorbent contactors of the present invention wherein the support layer 10 is in a corrugated form with a microtube occupying at least a portion of the folds, or furrows 17. Both sides of the corrugated support layer can contain adsorbent material, except surfaces within the furrows, which can be occupied by microtubes 12. Flow channels 16 can be formed between two opposing substructures. The adsorbent layers can be formed by wash-coating or spraying a uniform thickness of adsorbent material on both sides of the structure. FIG. 8 hereof is a section H of a contactor assembly comprised of a plurality of substructures G.

Figure 9:
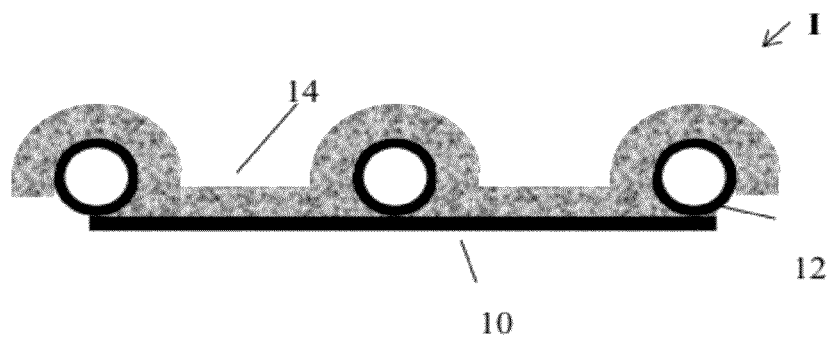
FIG. 9 hereof is another embodiment of a layered adsorbent contactor of the present invention. This embodiment is comprised of a single support layer onto which is provided a plurality of microtubes. The entire surface including the microtubes is covered by adsorbent material.
Figure 10:
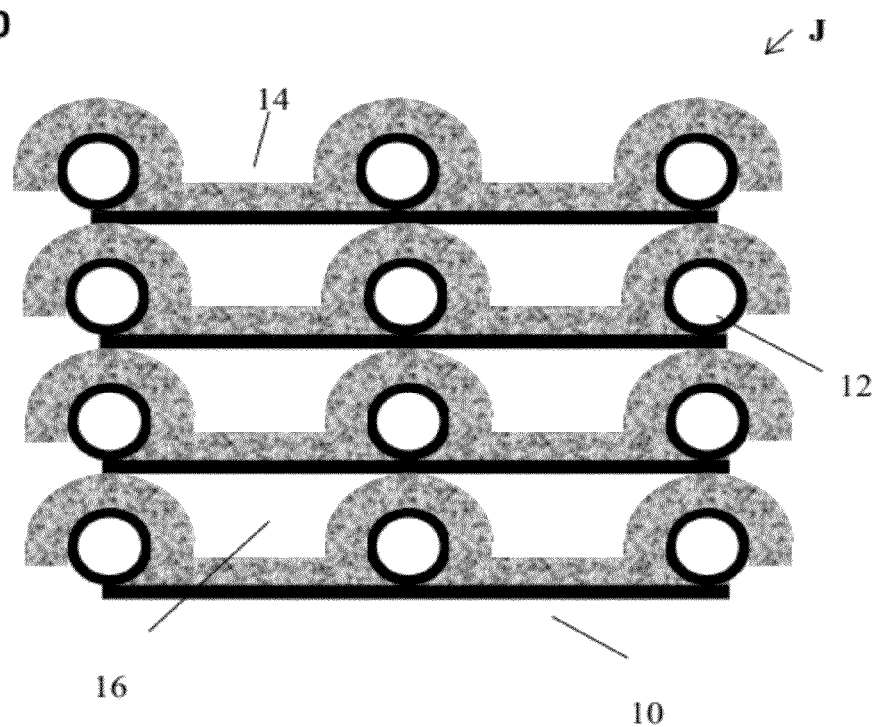
FIG. 10 hereof is a representation of another preferred adsorbent contactor of the present invention comprised of multiple units of the structure shown in FIG. 9 hereof.

FIG. 9 hereof shows a substructure I of another preferred adsorbent contactor structure of the present invention. In FIG. 9 substructure I is shown as being comprised of a support layer 10 having one surface in contact with a plurality of microtubes 12. The entire surface of substructure I, which is in contact with microtubes 12, as well as the microtubes themselves, is/are coated with a suitable adsorbent material 14. The opposite surface of the support layer does not generally contain adsorbent material. FIG. 10 hereof shows a section J of a production contactor structure comprised of a plurality of substructures I of FIG. 9 hereof.

Figure 11:
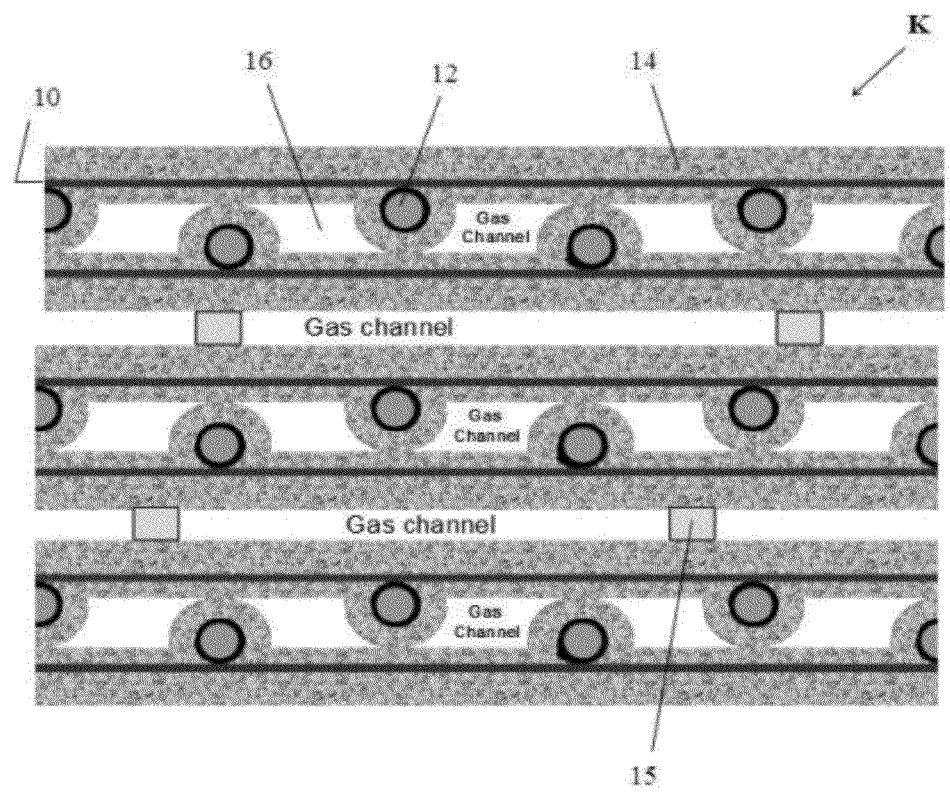
FIG. 11 hereof is a representation of an adsorbent contactor using multiple contactor layers of FIG. 9 hereof along with a plurality of spacers of suitable dimensions.

FIG. 11 hereof is a representation of an adsorbent contactor of the present invention comprised of a plurality of substructures of FIG. 9 hereof positioned opposite to that of the contactor of FIG. 10 hereof. That is, the microtube side of a support layer is positioned facing the microtube side of the next support layer. Gas channels can be formed between the adsorbent coated microtubes between a pair of support layers and by the use of spacers in a next pair of support layers. A suitable adsorbent material can be associated with both surfaces of a support layer.

FIG. 12 hereof is a representation a cylindrical adsorbent contactor assembly of the present invention showing a preferred method of keeping heat transfer fluid isolated from the adsorbent of the contactor. For example, this figure shows a side view of the spiral wound structure A of FIGS. 1 and 2 hereof, but with at least a faction of the microtubes 12 extending from the ends, or flush with the surface, of cylindrical structure A. The portions of the microtubes 12 extending from the ends of the cylindrical contactor can be supported in a suitable sealing end cap 20 which is typically not in contact with the cylindrical contactor structure, but which is typically separated from the contactor structure at a predetermined distance, leaving a gap 22 for conducting feed gas at one end and removing product gas from the opposite end. The end cap can be solid and only microtubes should generally extend through it, so that the only fluid that can pass through the end cap 20 can do so only by passing through microtubes 12. This figure shows the microtubes extending beyond the end cap, but, in an alternative embodiment, they do not extend beyond the end cap but end at the end caps and remain open at both ends to allow the free flow of fluid. Non-limiting examples of types of end caps that can be used in the practice of the present invention can include, solder, brazing material, and/or polymeric materials such as epoxy in which microtubes 12 are sealingly embedded. The end cap should be of suitable physical integrity to be able to withstand prolonged use at operating conditions.

The contactors herein are of specific benefit when used in Temperature Swing Adsorption (TSA) process. As discussed above, and for the purposed herein, the TSA process is an adsorption process for selectively adsorbing at least one gas component (i.e., target gas component) over at least another gas component in a feed gas mixture, wherein the process comprises at least one (1) adsorption step (i.e., wherein the target gas is selectively sorbed) and at least one desorption step (i.e., wherein the target gas is selectively desorbed), wherein the desorption comprises, at least in part, imparting heating into the adsorbent bed to desorb at least a portion of the target gas component. In some embodiments of these processes, the thermal regeneration step can be further assisted with use of a partial pressure purge displacement, or even a pressure swing. These combinations of processes can be referred to herein as temperature swing processes, as long as they employ a step that uses an induced heat input to the adsorbent, and preferably an increase in the temperature of the adsorbent, at some point during the regeneration step.

In TSA processes utilizing the adsorbent contactors disclosed herein, the adsorption step can preferably be performed at a first temperature ranging from −195° C. to 300° C., e.g., from 20° C. to 150° C. or from 30° C. to 120° C. Absolute total pressures during the adsorption step can be in range from 1 bara to 600 bara, e.g., from 2 bara to 200 bara or from 10 bara to 150 bara.

In certain preferred processes herein, the adsorbent bed can be heated to a second temperature higher than the first temperature used during the adsorption step. This second temperature can preferably be from 10° C. to 300° C. (e.g., from 20° C. to 200° C. or from 40° C. to 120° C.). Additionally or alternatively, a purge gas stream can be passed through the adsorbent bed during heating to keep the product end of the bed relatively (substantially) free of target gas component(s). In certain preferred embodiments, the purge gas stream can have a substantially lower content of the target gas component (s) than the feed gas mixture, e.g., the purge gas stream can have a content less than 10 mol %, for example less than 5 mol %, of the target gas component in the feed gas mixture.

In preferred applications of the present contactors, $CO_2$ can be removed from natural gas in the swing adsorption process. Here, it can be preferred to formulate the adsorbent with a specific class of 8-ring zeolite materials that has a kinetic selectivity, though equilibrium-based adsorption can be an alternative. The kinetic selectivity of this class of 8-ring zeolite materials can allow $CO_2$ to be rapidly transmitted into zeolite crystals while hindering the transport of methane, so that it is possible to selectively separate $CO_2$ from a mixture of $CO_2$ and methane. For the removal of $CO_2$ from natural gas, this specific class of 8-ring zeolite materials can have an Si/Al ratio from about 1 to about 25, or alternately from 2 to about 1000, from about 10 to about 500, or from about 50 to about 300. As used herein, the Si/Al ratio is defined as the molar ratio of silica to alumina of the zeolitic structure. This class of 8-ring zeolites can allow $CO_2$ to access the internal pore structure through 8-ring windows in a manner such that the ratio of single component diffusion coefficients for $CO_2$ over methane (i.e., $D_{CO2}/D_{CH4}$) can be greater than 10, preferably greater than about 50, greater than about 100, or greater than about 200.

Additionally or alternatively, in many instances, nitrogen may desirably be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas, like with $CO_2$, it can be preferred to formulate the adsorbent with a class of 8-ring zeolite materials that has a kinetic selectivity. The kinetic selectivity of this class of 8-ring materials can allow $N_2$ to be rapidly transmitted into zeolite crystals while hindering the transport of methane, so that it is possible to selectively separate $N_2$ from a mixture of $N_2$ and methane. For the removal of $N_2$ from natural gas, this specific class of 8-ring zeolite materials can have an Si/Al ratio from about 2 to about 1000, e.g., from about 10 to about 500 or from about 50 to about 300. This class of 8-ring zeolites can allow $N_2$ to access the internal pore structure through 8-ring windows in a manner such that the ratio of single component diffusion coefficients for $N_2$ over methane (i.e., $D_{N2}/D_{CH4}$) can be greater than 5, preferably greater than about 20, greater than about 50, or greater than 100. Resistance to fouling in swing adsorption processes during the removal of $N_2$ from natural gas can be one advantage offered by this class of 8-ring zeolite materials.

Additionally or alternately from $CO_2$, it can be desirable to remove $H_2S$ from natural gas which can contain from about 0.001 vol % $H_2S$ to about 70 vol % $H_2S$ (e.g., from about 0.001 vol % to about 30 vol %, from about 0.001 vol % to about 10 vol %, from about 0.001 vol % to about 5 vol %, from about 0.001 vol % to about 1 vol %, from about 0.001 vol % to about 0.5 vol %, or from about 0.001 vol % to about 0.1 vol %). In this case, it can be advantageous to formulate the adsorbent with stannosilicates, as well as the aforementioned class of 8-ring zeolites that can have kinetic selectivity. The kinetic selectivity of this class of 8-ring materials can allow $H_2S$ to be rapidly transmitted into zeolite crystals while hindering the transport of methane, so that it is possible to selectively separate $H_2S$ from a mixture of $H_2S$ and methane. For the removal of $H_2S$ from natural gas, this specific class of 8-ring zeolite materials can have a Si/Al ratio from about 2 to about 1000, e.g., from about 10 to about 500 or from about 50 to about 300. This class of 8-ring zeolites can allow $H_2S$ to access the internal pore structure through 8-ring windows in a manner such that the ratio of single component diffusion coefficients for $H_2S$ over methane (i.e., $D_{H2S}/D_{CH4}$) can be greater than 5, preferably greater than about 20, greater than about 50, or greater than 100. DDR, Sigma-1, and/or ZSM-58 are examples of suitable materials for the removal of $H_2S$ from natural gas. In some applications, it can be desired for $H_2S$ to be removed to the ppm or ppb levels.

Other non-limiting examples of selective adsorbent materials for use in embodiments herein can include microporous materials such as zeolites, AlPOs, SAPOs, MOFs (metal organic frameworks), ZIFs (zeolitic imidazolate frameworks, such as ZIF-7, ZIF-8, ZIF-22, etc.), and carbons, as well as mesoporous materials such as amine functionalized MCM materials, and the like, and combinations and reaction products thereof. For acidic gases such as hydrogen sulfide and carbon dioxide typically found in natural gas streams, adsorbents such as cationic zeolites, amine-functionalized mesoporous materials, stannosilicates, carbons, and combinations thereof can be preferred, in certain embodiments.

Adsorptive kinetic separation processes, apparatuses, and systems can be useful for development and production of hydrocarbons, such as gas and oil processing. Particularly, the provided processes, apparatuses, and systems can be useful for rapid, large scale, efficient separation of a variety of target gases from gas mixtures.

Apparatuses according to the current invention, and processes associated therewith, can enable the use of both equilibrium selectivity and kinetic selectivity adsorbents. Herein, equilibrium selectivity adsorbents are meant to describe adsorbent materials wherein selectivity between the species to be separated is based on the sorptive capacity of each species, when given sufficient time to establish equilibrium competitive sorption. Non-limiting examples of such equilibrium adsorbents useful for $H_2S$ and/or $CO_2$ separation from natural gas can include cationic zeolites, silica-based zeolites, aluminas, silica-aluminas, non-zeolitic silicas, amine species supported thereon/therein, and the like, and combinations thereof. Kinetic selectivity adsorbents discriminate amongst species by significant differences in the speed of adsorption of one species compared to other species, regardless of the respective species' equilibrium capacities/selectivities. Rapid cycle processes, such as those enabled by apparatuses according to the present invention, where sorption time is limited to a few minutes or less, tend to rely heavily on kinetic sorbents/process conditions. Rapid cycle adsorbents can be similar to kinetic separation sorbents and can advantageously include, inter alia, zeolites whose pore openings are in the approximate size range of (but typically some single digit percentage larger than) the smallest, or average kinetic, diameter of the target species.

The provided processes, apparatuses, and systems may be used to prepare natural gas products by removing contaminants and heavy ($C_{2+}$) hydrocarbons. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. Patent Application bearing Ser. No. 13/406,079, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-PSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-PSA units with minimal purge flow rates;

(h) using feed compression before one or more RC-PSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

While apparatuses according to the present invention can be used as a support for adsorbents in thermal swing processes, they can incorporate design characteristics that enable their advantageous use in heat exchange applications. The relatively high surface area and relatively short heat transfer distances can allow rather low approach temperatures to be achieved. Further, due to the high crush and burst strength of the small tubes utilized in the inventive designs described herein, it can be possible to utilize heat exchange fluids under relatively high pressures (e.g., at least about 100 psig, at least about 250 psig, at least about 400 psig, at least about 500 psig, from about 100 psig to about 2000 psig, from about 250 psig to about 2000 psig, from about 400 psig to about 2000 psig, from about 500 psig to about 2000 psig, from about 100 psig to about 1500 psig, from about 250 psig to about 1500 psig, from about 400 psig to about 1500 psig, from about 500 psig to about 1500 psig, from about 100 psig to about 1250 psig, from about 250 psig to about 1250 psig, from about 400 psig to about 1250 psig, from about 500 psig to about 1250 psig, from about 100 psig to about 1000 psig, from about 250 psig to about 1000 psig, from about 400 psig to about 1000 psig, or from about 500 psig to about 1000 psig) or between fluids with relatively high differential pressures (e.g., at least about 100 psi, at least about 250 psi, at least about 400 psi, at least about 500 psi, from about 100 psi to about 2000 psi, from about 250 psi to about 2000 psi, from about 400 psi to about 2000 psi, from about 500 psi to about 2000 psi, from about 100 psi to about 1500 psi, from about 250 psi to about 1500 psi, from about 400 psi to about 1500 psi, from about 500 psi to about 1500 psi, from about 100 psi to about 1250 psi, from about 250 psi to about 1250 psi, from about 400 psi to about 1250 psi, from about 500 psi to about 1250 psi, from about 100 psi to about 1000 psi, from about 250 psi to about 1000 psi, from about 400 psi to about 1000 psi, or from about 500 psi to about 1000 psi).

Additionally or alternately, the present invention can include one or more of the following embodiments.

Embodiment 1

A temperature swing adsorbent contactor comprised of an inlet end and an outlet end, further comprising: i) a plurality of open flow channels whose length is fluidly connecting the inlet end to the outlet end of the contactor, wherein at least one wall of said at least one open flow channel is comprised of an adsorbent material; ii) at least one support layer, in contact with, and supporting the adsorbent material; and iii) a plurality of microtubes in contact with, and supported by, the at least one support layer.

Embodiment 2

A swing adsorption process for separating contaminant gas components from a feed gas mixture (e.g., comprising methane and/or comprised of a natural gas stream) containing at least one target gas component (e.g., $CO_2$ and/or $H_2S$), which process comprises: a) conducting the feed gas mixture to a temperature swing adsorbent contactor having at least an inlet end and an outlet end, wherein the adsorbent contactor further comprises (i) a plurality of open channels whose length is fluidly connecting the inlet end to the outlet end of the contactor, wherein at least one wall of said at least one open flow channel is comprised of an adsorbent material; (ii) at least one support layer, in contact with, and supporting the adsorbent material; and (iii) a plurality of microtubes in contact with, and supported by, the at least one support layer; b) flowing at least a portion of the feed gas mixture through the open flow channels; c) during an adsorption cycle, adsorbing at least a portion of the target gas in the adsorbent material; d) retrieving a first product stream from the outlet end, wherein the first product stream has a lower mol % of the target gas component than the feed gas mixture; and e) during a desorption cycle, passing heating fluid through at least a portion of the microtubes, thereby desorbing at least a portion of the target gas in the adsorbent material to form a second product stream.

Embodiment 3

The contactor or process of embodiment 1 or embodiment 2, comprising at least two support layers, and the support layers, when viewed in a plane perpendicular to the length of the open flow channels, are each substantially flat and are substantially parallel relative to each other.

Embodiment 4

The contactor or process of embodiment 1 or embodiment 2, wherein the at least one support layer is wound into a spiral when viewed in a plane perpendicular to the length of the open flow channels.

Embodiment 5

The contactor or process of any one of the previous embodiments, wherein each microtube has an inside diameter from 0.20 mm to 2 mm.

Embodiment 6

The contactor or process of any one of the previous embodiments, wherein the contactor is comprised of multiple support layers, wherein at least two support layers are each comprised of a first surface and a second surface wherein said first surface is in contact with at least a portion of the microtubes, and wherein said second surface is in contact with a coating of the adsorbent material, and wherein the contactor is constructed by assembling the subunits such that each microtube is in contact with at least a portion of the adsorbent material.

Embodiment 6

The contactor or process of any one of embodiments 1-5, wherein the contactor is comprised of multiple support layers, wherein at least two support layers are each corrugated and each of the at least two support layers are in contact with at least a portion of the microtubes, and further wherein both surfaces of the support layers are in contact with at least a portion of the adsorbent material.

Embodiment 7

The contactor or process of any one of embodiments 1-5, which is characterized as being comprised of multiple support layers, wherein at least two support layers have each a first surface and a second surface, wherein said first surface is in contact with at least a portion of the microtubes, and wherein the adsorbent material is contained on at least a fraction of said first surface thereby covering at least a fraction of said first surface and covering at least a fraction of said microtubes.

Embodiment 8

The contactor or process of any one of the previous embodiments, wherein the contactor is comprised of multiple open flow channels, optionally not fluidly connected to one another, and is contained within a vessel that is capable of directing the flow of a feed gas mixture through the multiple open flow channels, and comprises separate fluid connections for the feed gas mixture and for a heating/cooling fluid (e.g., selected from water and steam).

Embodiment 9

The contactor or process of any one of the previous embodiments, wherein one or more of the following are satisfied: the microtubes are comprised of a material selected from stainless steel, aluminum, nickel, polymeric materials, carbon, glass, ceramics, and combinations and composites thereof; the adsorbent material is comprised of a material selected from cationic zeolites, amine-functionalized mesoporous materials, stannosilicates, carbon, and combinations and composites thereof; the adsorbent material is comprised of a microporous material selected from zeolites, AlPOs, SAPOs, MOFs, ZIFs, carbon, and combinations and composites thereof; the adsorbent material is comprised of an 8-ring zeolite; the adsorbent material is comprised of a zeolite having an Si/Al ratio from about 1 to about 25; the adsorbent material is comprised of a zeolite having a diffusion coefficient for $CO_2$ over methane ($D_{CO2}/D_{CH4}$) greater than 10; the adsorbent material is comprised of a zeolite having a diffusion coefficient for $N_2$ over methane ($D_{N2}/D_{CH4}$) greater than 10; the adsorbent material is comprised of a zeolite having a diffusion coefficient for $H_2S$ over methane ($D_{H2S}/D_{CH4}$) greater than 10; the adsorbent material is comprised of a zeolite selected from DDR, Sigma-1, ZSM-58, and combinations thereof.

Embodiment 10

The process of embodiment 8 or embodiment 9, wherein the heating fluid is passed through at least a portion of the microtubes during at least a portion of the desorption cycle of the temperature swing process and a cooling fluid (e.g., comprised of water) is passed through at least a portion of the microtubes during at least a portion of the adsorption cycle of the temperature swing process.

Embodiment 11

The process of any of embodiments 2-10, wherein the process is a rapid cycle temperature swing adsorption process in which the total cycle time greater than 10 seconds and less than 10 minutes, and/or wherein the feed gas mixture is conducted to the open flow channels at a pressure greater than 1000 psig.

Embodiment 12

The process of any of embodiments 2-11, wherein during the desorption cycle: the temperature of the adsorbent material is increased and the partial pressure of the target gas is reduced; and/or a purge gas is passed through at least a portion of the open flow channels.

Embodiment 13

A heat exchange process comprising: a) conducting a gaseous feed stream to a temperature swing adsorbent contactor having at least an inlet end and an outlet end and having a length, wherein the adsorbent contactor further comprises (i) a plurality of open channels whose length is fluidly connecting the inlet end to the outlet end of the contactor, wherein at least one wall of said at least one open flow channel is comprised of an adsorbent material; (ii) at least one support layer, in contact with, and supporting the adsorbent material; and (iii) a plurality of microtubes in contact with, and supported by, the at least one support layer; b) flowing at least a portion of the gaseous feed stream at a first temperature and a first pressure through the open flow channels; c) contacting the adsorbent contactor containing the gaseous feed stream with a heat exchange fluid under conditions sufficient for the contactor to exhibit a sharp thermal wave and to form a product stream at a second temperature lower than the first temperature and a second pressure, wherein the conditions include a feed stream pressure from about 250 psig to about 2000 psig and/or a heat exchange fluid pressure sufficient to attain a differential pressure between the gaseous feed stream pressure and the heat exchange fluid pressure from about 250 psig to about 2000 psig.

Embodiment 14

The process of embodiment 13, wherein the heat exchange fluid is initially at a heat exchange temperature allowing a $T_{90}$ and a $T_{10}$ can be defined with respect to the first temperature and the heat exchange temperature such that a temperature differential of ($T_{90}-T_{10}$) occurs over at most 50% of the length of the contactor.

Embodiment 15

The process of embodiment 13 or embodiment 14, wherein a maximum Peclet number, Pe, is less than 10, where Pe= $(U*L)/\alpha$, where U represents a heat exchange fluid velocity, L represents a characteristic distance over which heat is transported in a direction roughly perpendicular to fluid flow, and $\alpha$ represents an effective thermal diffusivity of the contactor over the distance L, and wherein U is from about 0.01 m/s to about 100 m/s, and L is less than 0.1 meter.

EXAMPLES

Example 1

Figure 13A:
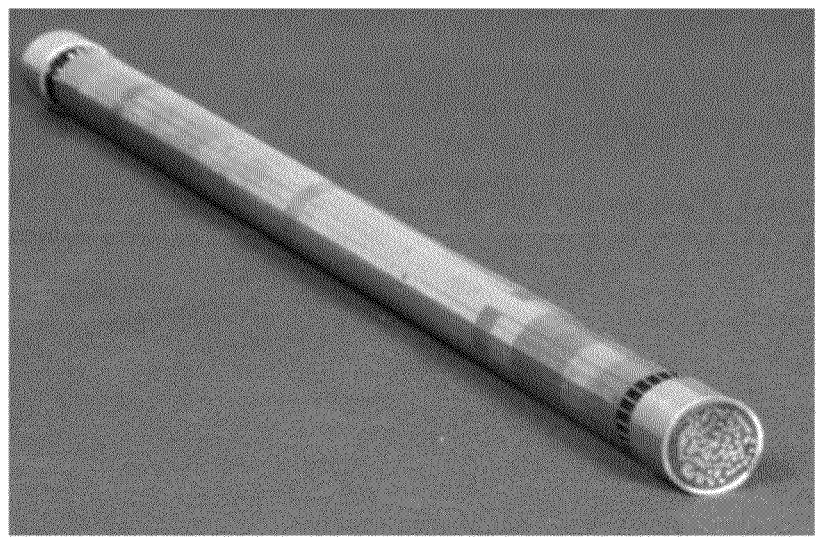
FIGS. 13A-B hereof are photographic representations (whole apparatus view and end view with pencil scale, respectively) of an apparatus according to the invention capable of generating relatively sharp thermal waves.
Figure 13B:
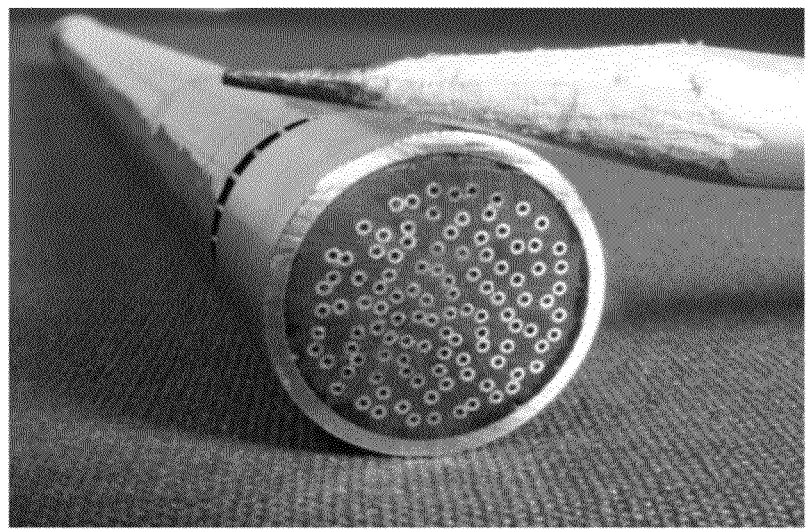
Figure 14A:
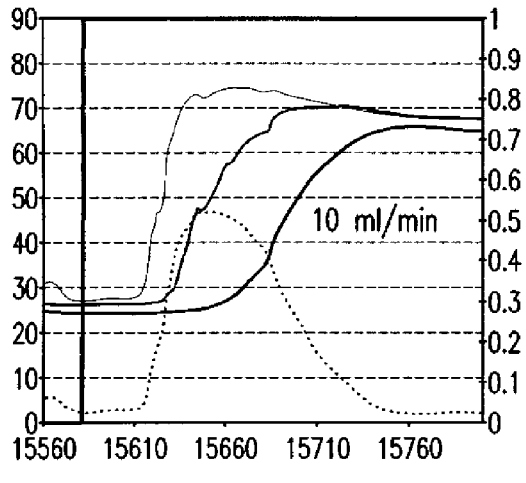
FIGS. 14A-E hereof are plots of the capability of the apparatus in Example 1 to carry a thermal wave at fluid flow rates of ~10, ~20, ~40, ~60, and ~80 mL/min.
Figure 14B:
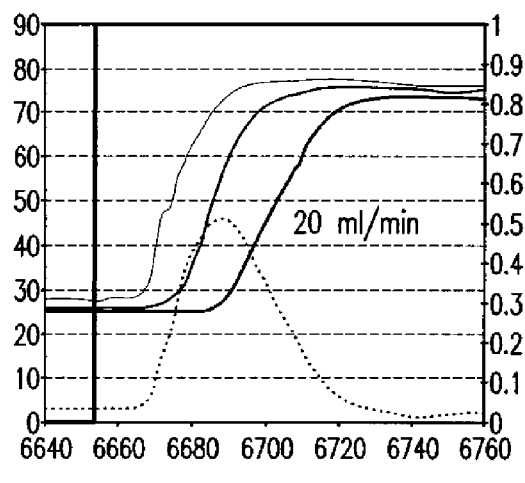
Figure 14C:
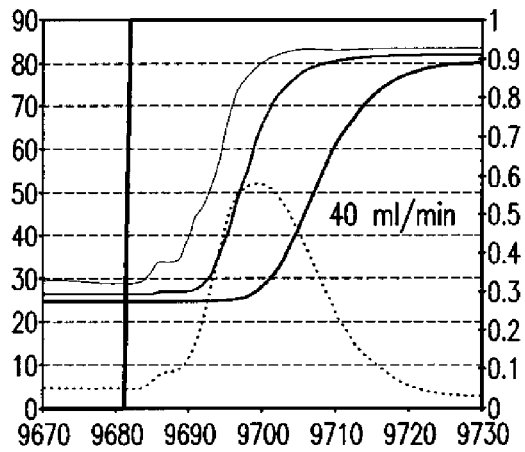
Figure 14D:
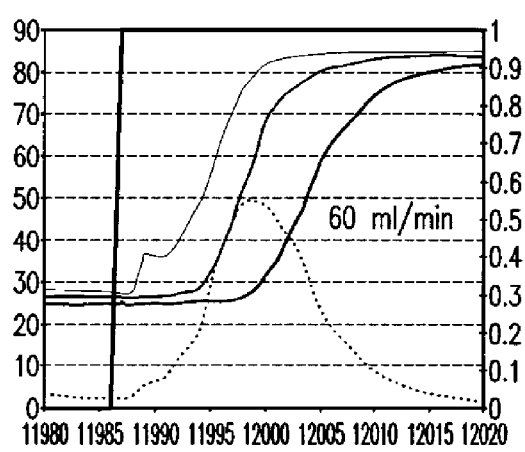
Figure 14E:
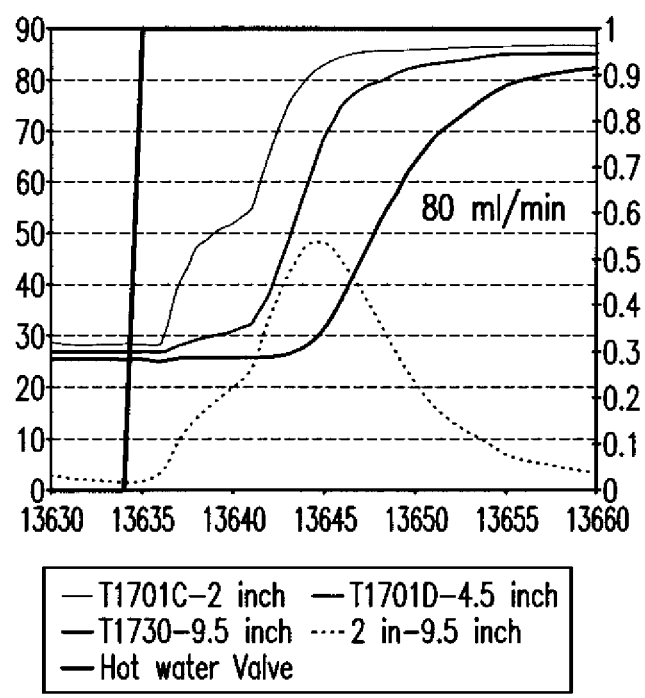

An example of a prototype apparatus of the present invention (not coated with sorbent) was constructed to demonstrate the rapid heat transfer capabilities of the apparatus and is shown in FIG. 13. The apparatus was constructed using about 109 thin walled ~24-gauge stainless steel tubes with outer-diameter of about 560 microns and inner-diameter of about 370 microns (nominal). The tubes were attached by spot welding and brazing to a ~50-micron thick stainless steel foil with ~2 mm tube center-to-center spacing, and the tube and foil were wound around a ~1/8" diameter mandrel tube. The tubes extended beyond the foil and were "potted" in epoxy within a ~5/8" diameter piece of steel tubing. The potting was done in a manner to maintain the tubes in an open condition. The final assembly was approximately 11 inches in length.

The apparatus was instrumented with three thermocouples located underneath the outer layer of foil at distances as measured from the entrance side of the foil (defined by water flow direction described below) of ~2", ~4.5", and ~9.5", and the entire apparatus was wrapped with insulating material. The end cap was attached to a water supply capable of rapidly switching from cold to hot water using a plastic tube and hose clamp to allow flow of water through all of the ~109 tubes simultaneously.

The following data was collected via the following steps: 1) the apparatus was held at room temperature (~20-25° C.) with water flow stopped; 2) the water in the plastic entrance tubing was heated with a heat gun to approximately the same temperature as the hot water supply (typically ~90° C.) to prevent cooling of the water in the tubing section; 3) hot water flow was initiated at various controlled water flow rates; and 4) the temperatures of the three embedded thermocouples was recorded as a function of time.

In this manner, it was possible to observe the presence of a relatively sharp thermal wave proceeding through the device in the direction of the hot water flow. FIGS. 14A-E show the temperatures recorded at the ~2", ~4.5", and ~9.5" points within the foil region of the apparatus at a series of water flow rates, noting the time at which the hot water flow was initiated, as well as the temperature difference between the temperatures measured at the ~2" point and the ~9.5" point. The time axis, plotted in seconds from an arbitrary start time, is different in each graph.

The volume of the water contained within the ~11" of the ~109 tubes was approximately 3 cm³. Thus, the water velocities at the test conditions and the time required for the water to traverse the ~7.5" between the ~2" and ~9.5" point thermocouples, as a function of the utilized water flow rates, were as follows:

| ml/min. | water velocity (inches/min.) | time for water to move from the 2 inch to the 9.5 inch points (seconds) |
| --- | --- | --- |
| 10 | 37 | 12.3 |
| 20 | 73 | 6.1 |
| 40 | 147 | 3.1 |
| 60 | 220 | 2.0 |
| 80 | 293 | 1.5 |

It may be seen from the data disclosed above and in FIG. 14 that a relatively sharp thermal wave was produced in the apparatus over a range of water flow rates and that, at higher flow rates, the entire apparatus may be temperature swung in significantly less than 1 minute. These experiments verified the high thermal conductivity of the apparatus and indicated that rapid cycle temperature swing adsorption processes were enabled by the apparatus and that relatively efficient heat recovery was possible.

What is claimed is:

1. A swing adsorption process for separating contaminant gas components from a feed gas mixture containing at least one target gas component, which process comprises:
   a) conducting the feed gas mixture to a temperature swing adsorbent contactor having at least an inlet end and an outlet end, wherein the adsorbent contactor further comprises
      i) a plurality of open channels whose length is fluidly connecting the inlet end to the outlet end of the contactor, wherein at least one wall of said at least one open flow channel is comprised of an adsorbent material;
      ii) at least one support layer, in contact with, and supporting the adsorbent material; and
      iii) a plurality of microtubes in contact with, and supported by, the at least one support layer;
   b) flowing at least a portion of the feed gas mixture through the open flow channels;
   c) during an adsorption cycle, adsorbing at least a portion of the target gas in the adsorbent material;
   d) retrieving a first product stream from the outlet end, wherein the first product stream has a lower mol % of the target gas component than the feed gas mixture; and
   e) during a desorption cycle, passing heating fluid through at least a portion of the microtubes, thereby desorbing at least a portion of the target gas in the adsorbent material to form a second product stream.

2. The process of claim 1, wherein the adsorbent contactor comprises at least two support layers, and the support layers, when viewed in a plane perpendicular to the length of the open flow channels, are each substantially flat and are substantially parallel relative to each other.

3. The process of claim 1, wherein the at least one support layer of the adsorbent contactor is wound into a spiral when viewed in a plane perpendicular to the length of the open flow channels.

4. The process of claim 1, wherein each microtube has an inside diameter from 0.20 mm to 2 mm.

5. The process of claim 4, wherein the heating fluid is selected from water and steam.

6. The process of claim 4, wherein the heating fluid is passed through at least a portion of the microtubes during at least a portion of the desorption cycle of the temperature swing process and a cooling fluid is passed through at least a portion of the microtubes during at least a portion of the adsorption cycle of the temperature swing process.

7. The process of claim 6, wherein the cooling fluid is comprised of water.

8. The process of claim 1, wherein the target gas component is selected from $CO_2$ and/or $H_2S$.

9. The process of claim 1, wherein the target gas component is $CO_2$.

10. The process of claim 1, wherein the feed gas mixture is comprised of methane.

11. The process of claim 1, wherein the adsorbent material is comprised of an 8-ring zeolite.

12. The process of claim 11, wherein the zeolite has a Si/Al ratio from about 1 to about 25.

13. The process of claim 1, wherein feed gas mixture is comprised of methane and $CO_2$ wherein $CO_2$ is the target gas component, and the zeolite has a diffusion coefficient for $CO_2$ over methane ($D_{CO2}/D_{CH4}$) greater than 10.

14. The process of claim 1, wherein feed gas mixture is comprised of methane and $N_2$ wherein $N_2$ is the target gas component, and the zeolite has a diffusion coefficient for $N_2$ over methane ($D_{N2}/D_{CH4}$) greater than 10.

15. The process of claim 1, wherein feed gas mixture is comprised of methane and $H_2S$ wherein $H_2S$ is the target gas component, and the zeolite has a diffusion coefficient for $H_2S$ over methane ($D_{H2S}/D_{CH4}$) greater than 10.

16. The process of claim 15, wherein the first adsorbent bed and the second adsorbent bed are comprised of a zeolite selected from DDR, Sigma-1, ZSM-58, and combinations thereof.

17. The process of claim 1, wherein the adsorbent material is comprised of a microporous material selected from zeolites, AlPOs, SAPOs, MOFs, ZIFs, carbon, and combinations and composites thereof.

18. The process of claim 1, wherein the adsorbent material is comprised of a material selected from cationic zeolites, amine-functionalized mesoporous materials, stannosilicates, carbon, and combinations and composites thereof.

19. The process of claim 1, wherein the process is a rapid cycle temperature swing adsorption process wherein the total cycle time greater than 10 seconds and less than 10 minutes.

20. The process of claim 1, wherein during the desorption cycle the temperature of the adsorbent material is increased and the partial pressure of the target gas is reduced.

21. The process of claim 20, wherein during the desorption cycle a purge gas is passed through at least a portion of the open flow channels.

22. The process of claim 1, wherein the feed gas mixture is comprised of natural gas.

23. The process of claim 22, wherein the feed gas mixture is conducted to the open flow channels at a pressure greater than 1000 psig.

24. A heat exchange process comprising:
   a) conducting a gaseous feed stream to a temperature swing adsorbent contactor having at least an inlet end and an outlet end and having a length, wherein the adsorbent contactor further comprises
      i) a plurality of open channels whose length is fluidly connecting the inlet end to the outlet end of the contactor, wherein at least one wall of said at least one open flow channel is comprised of an adsorbent material;

ii) at least one support layer, in contact with, and supporting the adsorbent material; and iii) a plurality of microtubes in contact with, and supported by, the at least one support layer;

b) flowing at least a portion of the gaseous feed stream at a first temperature and a first pressure through the open flow channels;

c) contacting the adsorbent contactor containing the gaseous feed stream with a heat exchange fluid under conditions sufficient for the contactor to exhibit a sharp thermal wave and to form a product stream at a second temperature lower than the first temperature and a second pressure, wherein the conditions include a feed stream pressure from about 250 psig to about 2000 psig and/or a heat exchange fluid pressure sufficient to attain a differential pressure between the gaseous feed stream pressure and the heat exchange fluid pressure from about 250 psig to about 2000 psig.

25. The process of claim 24, wherein the heat exchange fluid is initially at a heat exchange temperature allowing a $T_{90}$ and a $T_{10}$ can be defined with respect to the first temperature and the heat exchange temperature such that a temperature differential of $(T_{90}-T_{10})$ occurs over at most 50% of the length of the contactor.

26. The process of claim 24, wherein a maximum Peclet number, Pe, is less than 10, where $Pe=(U*L)/\alpha$, where U represents a heat exchange fluid velocity, L represents a characteristic distance over which heat is transported in a direction roughly perpendicular to fluid flow, and a represents an effective thermal diffusivity of the contactor over the distance L, and wherein U is from about 0.01 m/s to about 100 m/s, and L is less than 0.1 meter.

* * * * *